SEARCH ROOM

6380

March 31, 1959 W. R. AIKEN ET AL 2,880,341

FACSIMILE TUBE

Filed March 14, 1955 2 Sheets-Sheet 1

INVENTORS
WILLIAM R. AIKEN
LEIGH CURTIS FOSTER
BY James E. Toomey
ATTORNEY

March 31, 1959 W. R. AIKEN ET AL 2,880,341

FACSIMILE TUBE

Filed March 14, 1955 2 Sheets-Sheet 2

INVENTORS
WILLIAM R. AIKEN
LEIGH CURTIS FOSTER
BY
James E. Toomey
ATTORNEY 2,880,341

FACSIMILE TUBE

William R. Aiken, Los Altos, Calif., and Leigh Curtis Foster, Westmount, Quebec, Canada, assignors, by mesne assignments, to Kaiser Industries Corporation, a corporation of Nevada Application March 14, 1955, Serial No. 494,386

10 Claims. (Cl. 313—77)

This invention relates broadly to facsimile transmission and receiving and reproducing devices and more particularly to a cathode ray tube for use in a facsimile transmitting and receiving system.

The term "facsimile," as known in the art, applies to that branch of the science of graphic electrical communication which endeavors to convey the physical form of the subject matter from a first to a second position. Such operation basically comprises the effective division of the original subject matter at the transmitting station into a large number of elemental areas. The elemental areas are scanned in a given sequence at the transmitter station, and signals are generated to indicate the relative light shades of these areas. These signals are then transmitted to the equipment at the receiving station which reproduces the shades upon associated target equipment.

The equipment at the transmitter station must basically comprise (*a*) a scanning system which explores the elemental areas of the subject, and identifies the light shadings of the elemental areas in terms of electric current; (*b*) a mechanism which effects orderly exploration of these areas by the scanning system; (*c*) means for operating such mechanism at a uniform predetermined rate. The receiver station obviously must require (*a*) a recording system for translating the signals representing the elemental areas into visual markings; (*b*) a mechanism including synchronizing means for marking the corresponding elemental areas at the receiver unit at the same speed at which the areas are scanned at the transmitting station; and (*c*) a sensitive surface for receiving such markings.

It is apparent from the foregoing description that a facsimile system can only be as successful as the means which scan the elemental areas and the means which reproduce the signals representative thereof at the receiver station. The present invention is primarily directed to the provision of an improved component of the scanning arrangement of a facsimile system, and particularly to an improved cathode ray tube for use in the transmitting and receiver sections of the system.

The application of cathode ray tube scanning to facsimile systems may be accomplished in several different ways. As in television, both horizontal and vertical scanning is necessary. At the sending or transmitting end a successful method employed is flying-spot scanning, the moving spot on the phosphor screen being projected optically onto the subject copy and the reflected light caught in a photo tube, which then provides the facsimile signal. The rapid horizontal scanning is provided by deflection of the beam of the cathode ray tube, the vertical scanning, either by movement of the tube or by vertical motion of the subject copy.

At the receiving end the transient image on the cathode ray tube screen must be photographed to get permanent record. Also, as at the transmitting end, there are two modes of operation which are possible. In one case horizontal scanning is by cathode ray tube while vertical scanning is obtained by moving the film. In another case, both horizontal and vertical scanning are by cathode ray tube, so that a television-like raster is employed. It is not essential, of course, to record by cathode ray tube at the lower speeds, and in such arrangement, mechanical facsimile recorders have been used with electronic scanners.

In the selection of a cathode ray tube for use in a facsimile system, the major requirements are (1) a flat screen, (2) a very small spot of light, and (3) ample spot brightness.

Accordingly, it is an object of the present invention to produce a cathode ray tube which is smaller in overall dimensions, hence reduced in a size relative to those of the known type, thus being extremely convenient to use.

Another object of the invention is to produce a cathode ray tube for use in a facsimile system which is capable of forming an extremely small, well focused beam of electrons thereby exhibiting a correspondingly small spot of light on the phosphor screen of the tube.

A further object of the invention is to produce a cathode ray tube useful in facsimile systems which tube is capable of producing a bright spot of light of ample intensity for scanning the material to be transmitted and for satisfactorily exciting the photosensitive substance forming the permanent record of the received information.

The present invention incorporates a cathode ray tube which includes a means for delivering a beam of electrons, such as a conventional electron gun, a target electrode disposed in substantial parallel relation with said beam of electrons, and deflection means disposed in alignment with said beam of electrons for deflecting said beam of electrons toward said target.

The preferred embodiment of the invention contemplates a cathode ray tube comprising a relatively elongate evacuated glass envelope having an electron gun arrangement disposed therewithin at one extremity thereof. The electron gun is capable of producing a beam of electrons along a path substantially parallel to the longitudinal axis of the envelope. A plurality of generally U-shaped deflection electrodes spaced from one another, is disposed adjacent the beam path and in parallel alignment with the electron gun, and each electrode is adapted to be individually energized from a source of potential outside the evacuated envelope. These electrodes form a channel through which the electron beam is caused to travel. Manifestly, the channel so formed has an open side thus permitting the flow of electrons downwardly through the open side whenever the proper voltage conditions are impressed on the electrodes to deflect the electron beam. A phosphor target is positioned adjacent to and coextensive with the open side of the channel formed by the electrodes.

It will be understood that, in operation, the electrodes are energized to provide a field free-region within the channel and the beam of electrons emitted by the electron gun is caused to travel through the channel along a path substantially parallel to the longitudinal axis of the envelope. The electrodes constituting the channel are thereupon sequentially energized by a potential negative with respect to the electrons thereby causing the electrons to be deflected so as to impinge on the phosphor target in a linear type trace. The impinging electrons excite the phosphor which, in turn, gives off light in proportion to the energy of the electron beam. The energy of the electron beam is controlled by the incoming message impulses which are impressed on the control grid or the cathode of the electron gun to thereby density modulate the beam.

It will be discerned that the display presented on the phosphor target is in the form of a straight line which is directed on the light sensitive recording material of a conventional facsimile system. The light sensitive material may be in the form of a moving film, rotating drum, or the like. The message displayed on the phosphor target forms the horizontal component of a pictoral presentation, and the vertical component is provided by moving the light sensitive material in a direction approximately perpendicular to the line formed by the present cathode ray tube. The movement of the light sensitive material at the receiver is synchronized with the movement of the picture or message at the location of the transmitter, so that as the picture to be transmitted is moved in a vertical direction the light sensitive material is simultaneously moved in synchronism.

The invention will now be described more in detail as applied to the specific cathode ray tube including several embodiments; it should, however, be understood that the invention is not limited to the particular embodiments disclosed hereinafter, and that its scope is defined by the appended claims.

Figure 1:
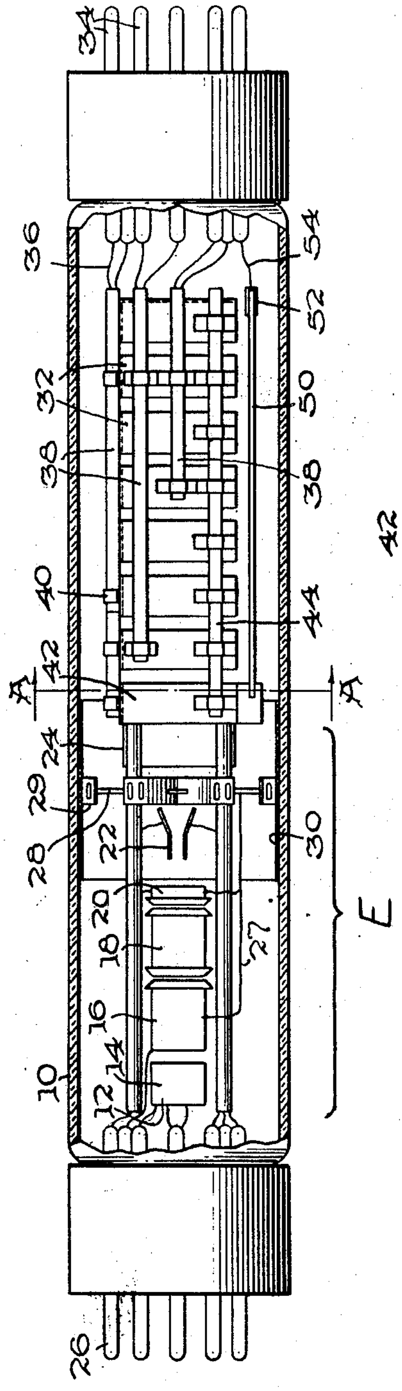
Fig. 1 shows a partially cut away side elevation of the cathode ray tube embodying the novel features of the present invention.
Figure 2:
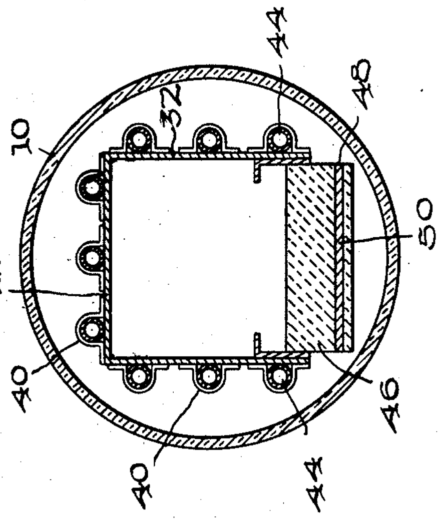
Fig. 2 is a vertical cross-sectional view of the tube shown in Fig. 1 taken along line A—A.

In accordance with the invention, as shown in Figures 1 and 2, there is provided a generally elongate glass envelope 10 having disposed therewithin the operable elements including the novel features of the cathode ray tube. A conventional electron gun arrangement is disposed at one end of the envelope 10, and is generally indicated as E. The electron gun E comprises a cathode 12, control grid 14, accelerating electrode 16, focussing electrode 18, a second accelerating eletrode 20, horizontal deflection plates 22, and vertical deflection plates 24. The elements of the electron gun E are suitably energized from an external source through their respective mounting pins 26. The portion of the electron gun E in the region of the horizontal and vertical plates 22 and 24 respectively is provided with a spacer unit 28 having radially extending arms 29 yieldingly engaging a conductive coating 30 on the inner surface of the envelope. The spacer unit 28 maintains the gun E in a fixed position within the envelope 10.

The conductive coating 30 on the inner surface of the envelope 10 obviates the possibility of an electrostatic charge accumulation thereon. If the electron beam of a cathode ray tube "sees" the glass envelope, which is a non-conductor, some of the electrons of the beam may land on the non-conductor thereby causing the glass to become electrostatically charged. A charge so accumulated would directly affect the beam travel and in turn the tube's operating characteristics. Accordingly, to prevent the objectionable charge accumulation, a conductive coating, such as aquadag, is coated on the inner surface of the tube in the region in which the beam would otherwise "see" a non-conductive surface. The coating 30 is maintained at equipotential with respect to the accelerating electrode 16 and the second accelerating electrode 20 by means of an electrical conductor 27 connected to each of the electrodes 16 and 20 and also to the spacer unit 28 which is in electrical contact with the conductive coating 30.

A plurality of deflection electrodes 32 in spaced relation from one another is disposed in the envelope 10 in substantial alignment with the electron gun E. The electrodes 32 are generally U-shaped as illustrated in Figs. 2 and 4; however the electrodes 32 may be fabricated to conform to other shapes, such as arcuate. Such a variance in contour would not be outside the scope of the present invention. The deflection electrode 32 most removed from the electron gun E has a back plate shown in dotted lines in Fig. 1 and Fig. 3 formed as an integral part of its structure and acts to prevent the passage of any electrons therethrough.

Each electrode 32 is arranged to be energized from an external source of potential through electrically conducting mounting pins 34 and electrically conducting wires 36. The electrically conducting wires 36 are formed of 302-type stainless steel wire and are in the order of 0.040 inch in diameter. Stainless steel wire of the 302-type is employed due to its non-magnetic properties, and because the wire has sufficient strength to rigidly position the one end of the electrode supporting structure within th eenvelope 10, the other end of the structure is supported by the spacer member 28.

Ceramic insulating members 38 are provided to receive the conductors 36 and insulate them from the deflection electrodes 32. The insulating members 38 are mounted on the outer surface of the deflection electrodes 32 and are fixedly positioned relative thereto by fastening yokes 40. It will be readily discerned that the ceramic insulating members 38 are of varying lengths corresponding to the length of their respective conductor. Accordingly, the ceramic member 38, which receives the electrical conductor 36 supplying potential to the deflection electrode 32 closest to the electron gun E, extends the complete length of the plurality of deflection electrodes.

In order to effect greater overall strength and to further militate against cantilevering of the assemblage, rigid rod-like members 44 are provided.

Intermediate the electron gun assembly E and the plurality of deflection electrodes 32 is an electrode 42 maintained at a proper positive potential with respect to the electron beam thereby causing to attract or draw the electrons of the electron beam emitted from the cathode 12. The electrode 42 is of the same general shape or configuration as the individual deflection electrodes 32. An insulating block 46 having a recessed or slotted portion 48 formed therein is disposed within the open portion of the electrode 42. The slotted portion 48 is adapted to receive an aluminized phosphor coated glass target plate 50. An electrical connector 52 connects the target plate 50 to a source of potential outside the tube, not shown, through an electrical conductor 54 and its respective mounting pin 34. The potential impressed on the target 50 must be substantially equal to the potential of the deflection plates 32 thus permitting the electrons to travel the entire length of the deflection plates 32 without being deflected. It should be pointed out that the mounting pins 26 and 34 are of the conventional type suitable for mounting in and thereby making electrical contact with a mating female receptacle into which are fed the various power supplies.

Figure 3:
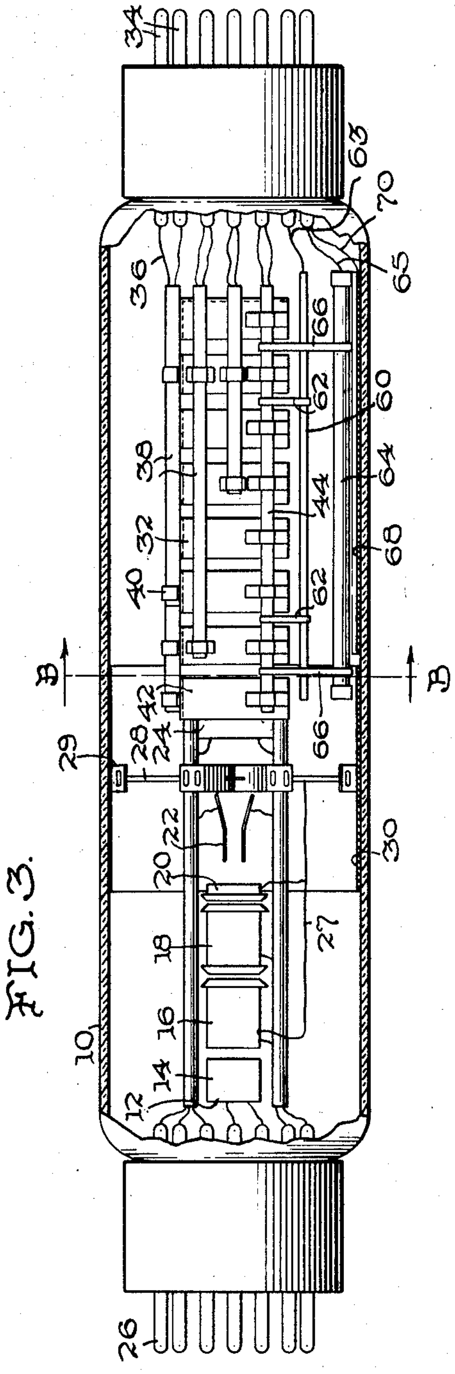
Fig. 3 shows a partially cut away side elevation of the cathode ray tube showing an embodiment wherein a focussing electrode arrangement is provided.
Figure 4:
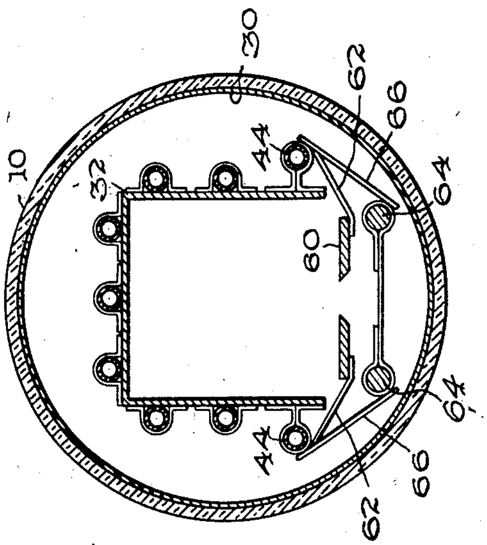
Fig. 4 is a vertical cross-sectional view of the embodiment of the tube shown in Fig. 3 taken along line B—B.

The embodiment shown in Figures 3 and 4 incorporates the novel features of the cathode ray tube shown in Figures 1 and 2 with supplemental focussing means and has the phosphor coating deposited on the inner surface of the tube. The electron gun structure E and the deflection electrodes 32 are the same as in Figures 1 and 2. A slotted electrode 60 co-extensive with the channel formed by the open sides of deflection electrodes 32 is suspended by supporting bands 62 from the rigid non-conducting member 44. Potential is applied to the slotted electrode 60 through a conductor 63 which in turn is electrically connected to its respective mounting pin 34. Suspended therebeneath is a pair of focussing electrodes 64 supported by bands 66 which are connected to the rigid supporting members 44. Potential is applied to these electrodes in a manner similar to that employed to energize the slotted electrode 60. An electrical conductor 65 is coupled to each of the electrodes 64 and is in turn connected to its respective mounting pin 34. A phosphor target 68 is positioned on the inner surface of the envelope 10 and is electrically connected to a potential source outside the tube through an electrical conductor 70 and its respective mounting pin 34.

In operation of the embodiment shown in Figs. 1 and 2, the cathode 12 may be driven by the incoming signal or impulse which is desired to be translated into light or the control grid 14 may be driven by the incoming signal. Regardless of which alternative is selected, the density of the beam of electrons emitted from the cathode is modulated in accordance with the signal. The beam is then caused to be drawn toward and through the accelerating electrode 16, to the focussing electrode 18. The focussing electrode 18 focuses the beam and causes the beam to enter and be accelerated by the accelerating electrode 20 which is at equipotential with the accelerating electrode 16. The horizontal deflection plates 22 and the vertical deflection plates 24 tend to maintain a substantially linear beam of electrons which is directed along the longitudinal axis of the tube and through the electrodes 42 and 32 to the back plate supported on the electrode furthest from the gun. The initial beam path is provided by maintaining electrode 42 at a potential which is positive with respect to cathode 12 and by maintaining deflection electrodes 32 at a positive potential. The back plate is necessary to prevent electron travel into the region of the tube beyond the last deflection electrode. Control voltages are applied sequentially to the individual deflection electrodes by an electric generator, such as the generator described in applicants' co-pending applications Serial Number 355,965, now abandoned and Serial Number 396,120 now Patent No. 2,795,731.

In order to more clearly define the manner in which the voltages are impressed on the deflection electrodes, it must be pointed out that it may be desirable to energize only a portion of the entire number during a single sweep of the electron beam which would obviously result in a shorter trace on the phosphor target than when the deflection voltages are sequentially impressed on the entire number of deflection electrodes.

For purposes of illustration, the deflection electrodes 32 could be maintained at 800 volts positive potential allowing the beam to make a complete pass to the last electrode. It should be pointed out that in this condition the beam has only a horizontal velocity component along the longitudinal axis of the tube. The potentials impressed on the deflection electrodes 32 are sequentially decreased to a value sufficient to deflect the electron beam. Manifestly, as the potential of the electrode most removed from the electron gun E approaches a lower value, the electron beam "sees" a repelling electrostatic field and due to this repelling field the beam is given a vertical velocity component which causes the beam to move toward and impinge the phosphor target 50 which is at the positive potential of the electrode. The phosphor target 50 being excited by the impinging electrons gives off light proportional to the signal received by the electron gun arrangement E. The potentials of each of the deflection plates 32 is varied or decreased to approach zero potential thus causing the beam to impinge sequentially at points away from the point of first contact on the target and thereby resulting in a single sweep across the face of the phosphor target 50. Upon completion of a single sweep, the deflection electrodes 32 are recharged to 800 volts and the sequential potential variance is repeated.

Figure 5:
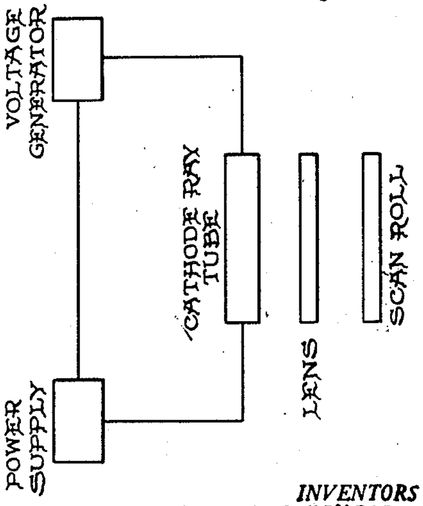
Fig. 5 is a block diagram showing a conventional facsimile system employing the cathode ray tube of the present invention.

It will be apparent to those skilled in the art from an examination of Figure 5, the manner in which the cathode ray tube of the invention may be incorporated into a facsimile system. Figure 5 illustrates a facsimile system in diagramatic form showing the voltage generator, power supply, cathode ray tube, lens arrangement, and scan roll.

The operation of the deflection electrodes is identical in each embodiment of the invention. The embodiment shown in Figures 3 and 4 employs a focussing system which is operative to focus the beam into an extremely fine spot prior to impinging on the phosphor target 68. As described above, the beam is deflected by the field established by the deflection electrodes 32 and is caused to travel toward and impinge the target 68 shown in Figures 3 and 4. The deflected beam passes through the slotted electrode 60, which is maintained at substantially the same potential as the deflection electrodes 32. The electrode 60 shields the region or channel defined by the deflection electrodes 32 from any stray fields present within the envelope and due to the equipotential with respect to the deflection electrodes 32 establishes a more perfect field-free region thereby permitting the electron beam to travel through this region without being deflected until proper deflection voltages are applied to the deflection electrodes 32. After the electron beam is deflected by the field established when proper negative potential is applied to the deflection electrodes 32, it is caused to travel to a plane which bisects the plane of a pair of focussing electrodes 64 which electrodes are maintained at a potential which tends to compress the beam making it more dense as it impinges the target 68. The potential impressed on the focussing electrodes 64 through their respective mounting pins 34 and electrical conductors 65 is negative with respect to the cathode potential and effectively functions as an electron lens establishing an electrostatic field repelling the electrons in a direction substantially transverse to their axis of motion, thereby effecting a compression of the beam in one plane prior to its impingement on the target 68.

As a general rule in order to obtain a fine focus of the beam on the target in the conventional cathode ray tubes, the beam current must be decreased resulting in corresponding decrease in the intensity of the brightness of the spot of light presented by the target. The present tube, however, has inherently fine focussing characteristics which result without decreasing the beam intensity. More specifically, the shape of the beam in its path through the field-free region defined by the deflection electrodes 32 is not of major significance since the beam is refocussed prior to its registration with the target. Since the novel tube will tolerate the beam blowup which occurs in the free field region as the beam current is increased to values which are not acceptable in conventional cathode ray tubes, the beam current can be increased to provide a spot of greatly increased brightness.

The voltages impressed on the deflection electrodes 32 establish a field which causes the electrons to converge in the region of the open side of the channel defined by said electrodes. The points of convergence can be varied by increasing or decreasing the maximum value of the voltages impressed on the deflection electrodes. At the point the beam is first deflected, it is focused in one plane; namely, a plane transverse to the axial travel of the electron beam. With the application of the first deflection force to the beam and the bending of same in a direction toward the target, the cross-sectional shape of the beam is substantially an ellipse. However, as the beam travels toward the target, the resultant field within the deflection electrodes 32 causes compression of the beam whereby the major and minor axes of the ellipse progressively decrease in such a manner that they approach the same value at a point on or near the target. Manifestly, as the major and minor axes of beam cross-section approach substantially the same value, the cross-sectional shape substantially approximates a circle resulting in a small beam of electrons without a diminution of intensity impinging the target which exhibits a small, very bright spot of light.

According to one embodiment of the invention the novel tube may be adapted to provide a beam spot of the conventional size which is of a brightness not normally experienced in conventional type tubes, such arrangement is achieved by using supplemental focusing means such as illustrated in the embodiments of Figs. 3 and 4, and which basically comprise a slotted electrode 60 and focusing electrodes 64. The slotted electrode 60 functions, not only to maintain a more perfect field-free region within the channel formed by the electrodes 32, but also to collimate the beam of electrons which passes therethrough. The focusing electrode 64 is maintained at a potential which tends to compress and focus the the beam of electrons prior to impinging the target 68. Manifestly, the powerful focusing action in this new tube makes possible the use of increased beam current values without experiencing beam blowup which normally accompanies such increase. As a result the tube provides a very small spot on the phosphor target which is high in definition and of greatly increased brightness.

In conclusion, it should be pointed out that the excellent definition and focusing characteristics of the present cathode ray tube are in a large part due to the fact that the deflection system is such as to cause the electron beam to impinge the target at a large angle of convergence, thereby militating against spot distortion and objectionable secondary emission.

What is claimed is:

1. A cathode ray tube comprising means for delivering a beam of electrons, a target electrode disposed in spaced and substantially parallel relation with said beam of electrons, means for deflecting and focussing said beam of electrons toward said target electrode, and supplemental focussing means disposed intermediate said deflection means and said target electrode.

2. A cathode ray tube comprising means for delivering a beam of electrons, a phosphor coated target electrode spaced from and substantially parallel to said beam, a plurality of electrostatic deflection means disposed in alignment with said beam for deflecting and focussing said beam in a direction toward said target electrode, and supplemental focussing means disposed intermediate said target electrode and said plurality of electrostatic deflection means for focusing said beam on said target.

3. A cathode ray tube comprising means for delivering a beam of electrons, a target electrode disposed in spaced and substantially parallel relation with said beam of electrons, and a plurality of deflection electrodes shaped to form a channel for said beam of electrons including means for applying energizing potentials to said electrodes to deflect and focus said beam of electrons from said channel into impingement with said target electrode.

4. A cathode ray tube comprising an envelope, means for forming an electron beam along a path, a phosphor coating on a portion of the inner surface of said envelope, a plurality of electrodes spaced along the electron beam path for deflecting the electron beam toward said phosphor coating, a slotted electrode disposed substantially parallel to the longitudinal axis of said envelope in a plane intermediate said phosphor coating and said plurality of electrodes, and a pair of spaced electrodes disposed in a plane intermediate said slotted electrode and said phosphor coating.

5. A cathode ray tube comprising an evacuated envelope, a phosphor target within said envelope, means for forming an electron beam along a path initially substantially parallel to the longitudinal axis of said envelope, a plurality of deflecting means including means for selectively energizing each of the deflecting means to deflect the electron beam substantially transverse to the initial direction thereof in the direction of the target, and supplemental focussing means for electrostatically focussing the beam disposed between said deflection means and said phosphor target.

6. A cathode ray tube comprising an elongate envelope and an electron gun disposed therewithin forming a beam of electrons along a path generally parallel to the longitudinal axis of said envelope, a phosphor target, a plurality of channel shaped electrostatic deflection electrodes spaced from one another and disposed such that the beam of electrons emitted from said electron gun travels the channel formed by said plurality of electrodes, the open sides of the channel electrodes being arranged in an aligned manner; a slotted electrode disposed in the region adjacent to and spaced from the open sides of said plurality of electrodes, and a pair of parallel focussing electrodes interposed between said slotted electrode and said phosphor coating for achieving supplementary focussing.

7. A cathode ray tube comprising an evacuated elongate envelope and disposed therewithin an electron gun for forming a beam of electrons along a path substantially parallel to the longitudinal axis of said envelope, a phosphor target, a plurality of substantially U-shaped electrodes disposed in spaced relation from one another and in alignment with said beam of electrons having their open side facing said phosphor target, means for individually connecting energizing potentials to each of said plurality of electrodes, a slotted electrode disposed intermediate said phosphor target and the open side of said plurality of electrodes, and a pair of focussing electrodes disposed adjacent said phosphor target for achieving supplementary focussing.

8. A cathode ray tube comprising an electron beam source, an initial target for terminating said electron beam as delivered along a first predetermined path, a target electrode disposed in spaced relation with said electron beam path, and deflection means disposed along the beam path between said initial target and said source for selectively deflecting said beam from said path into registration with said target electrode.

9. A cathode ray tube comprising an envelope, means for projecting an electron beam along a path, a target electrode disposed in spaced relation with said beam, a plurality of electrodes spaced along the electron beam path for selectively deflecting the electron beam toward said target at various points along its length, a slotted electrode disposed substantially parallel to the longitudinal axis of the envelope in a plane intermediate said target electrode and said plurality of electrodes, and a pair of spaced electrodes disposed in a plane intermediate said slotted electrode and said target electrode.

10. A facsimile tube for use with facsimile equipment comprising an electron beam source means for delivering a beam along a substantially linear path, means for modulating said beam source with facsimile signals received thereby, a linear trace target for use with associated facsimile equipment disposed in spaced and substantially parallel relation with respect to the initial path of the beam and relative to the facsimile recorder equipment, a plurality of deflecting electrodes disposed in spaced and substantially coextensive alignment with said target, and means for applying energizing potentials selectively to each of said plurality of deflecting electrodes to deflect said modulated beam into registration with successive points on said target to thereby accomplish the presentation of facsimile signal linear traces thereon for transfer to said facsimile recorder equipment.

References Cited in the file of this patent

UNITED STATES PATENTS

| | | |
|---|---|---|
| 1,962,873 | Parker | June 12, 1934 |
| 2,118,867 | Schlesinger | May 31, 1938 |
| 2,176,599 | Vingerhoets et al. | Oct. 17, 1939 |
| 2,217,198 | Davisson | Oct. 8, 1940 |
| 2,449,558 | Lanier et al. | Sept. 21, 1948 |
| 2,642,535 | Schroeder | June 16, 1953 |
| 2,795,731 | Aiken | June 11, 1957 |